United States Patent [19]

Smith

[11] 4,415,390

[45] Nov. 15, 1983

[54] INTERNAL WRAPPING METHOD AND APPARATUS

[75] Inventor: Robert B. Smith, Columbus, Ohio

[73] Assignee: Gas Research Institute, Chicago, Ill.

[21] Appl. No.: 320,228

[22] Filed: Nov. 12, 1981

[51] Int. Cl.³ .............................................. B65H 81/00
[52] U.S. Cl. .................................... 156/187; 156/195; 156/391; 156/392; 156/428
[58] Field of Search ................. 156/391–392, 156/187–188, 74, 195; 118/105, 207, 306, 254

[56] References Cited

U.S. PATENT DOCUMENTS

| | | | |
|---|---|---|---|
| 2,133,013 | 10/1938 | Boylan et al. | 118/105 |
| 2,516,242 | 7/1950 | Munger | 156/391 X |
| 3,126,306 | 3/1964 | Sherman | 156/392 X |
| 3,232,812 | 2/1966 | Loventy et al. | 118/254 X |

OTHER PUBLICATIONS

"Welding Plastic Tube Lining", PTC Published Application, 1/8/81, PCT/US80/00767, Zimmerman.

*Primary Examiner*—David A. Simmons
*Attorney, Agent, or Firm*—Robert B. Watkins

[57] ABSTRACT

A method and apparatus for internally wrapping the surface of a conduit, cylinder or pipeline with a sealing membrane which is adhered to the interior surface. The apparatus applies the membrane in a helical spiral by taking the membrane from a roll and pressing it against the interior surface while applying an adhesive and while transporting the roll longitudinally in the conduit on a transport assembly that rolls internally in the conduit.

9 Claims, 3 Drawing Figures

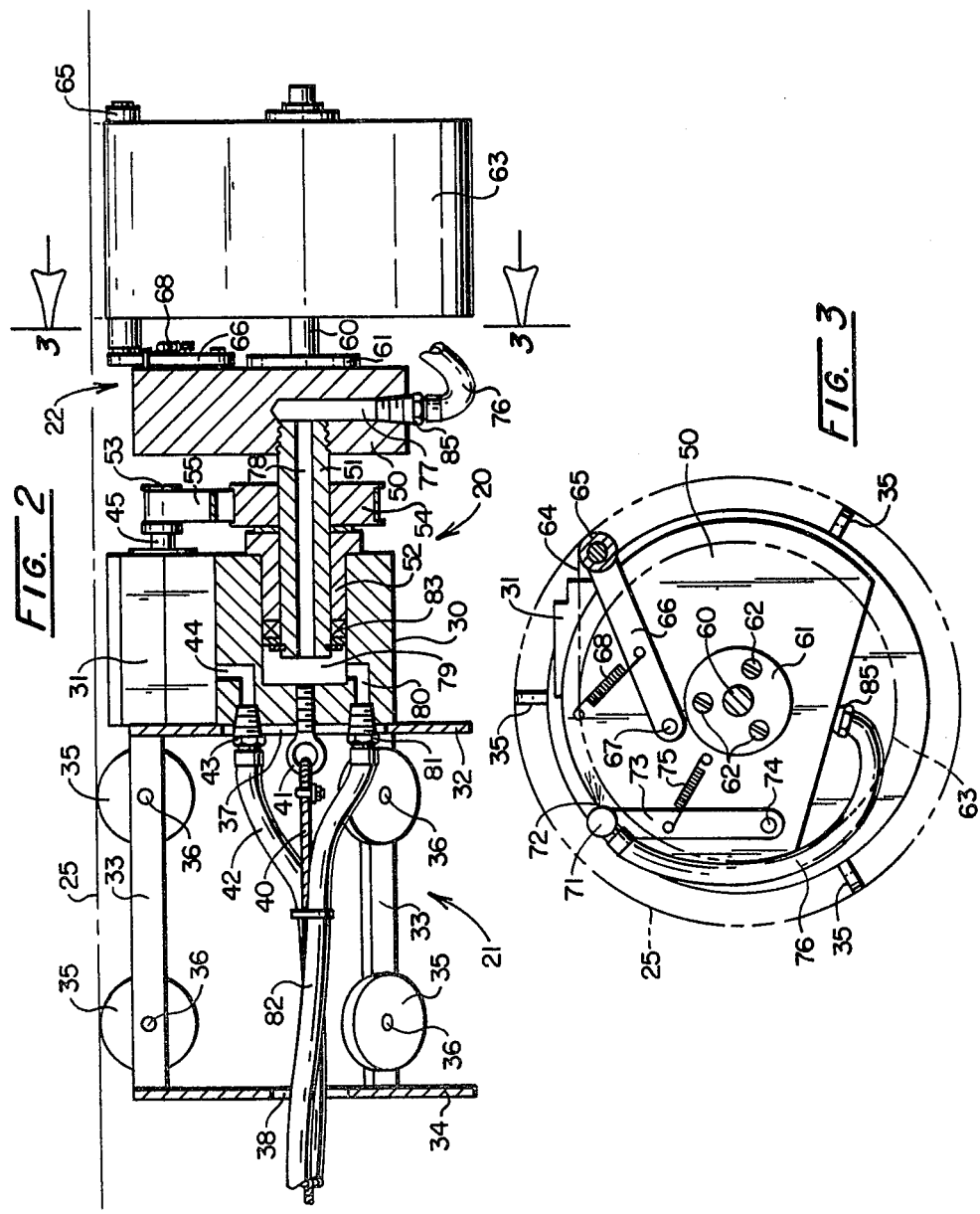

INTERNAL WRAPPING METHOD AND APPARATUS

SUMMARY OF THE INVENTION

This invention relates to apparatus for wrapping the interior circumferential surface of a conduit, cylinder or pipeline. More particularly, it is an apparatus for adhering and sealing a covering membrane on the inside surface of a conduit while under the control of operators who are situated external to the conduit.

Briefly and in summary, the method of this invention comprises spirally unwinding a sealing membrane from a roll within a conduit, followed by pressing and adhering the membrane against the inner circumferential wall of the conduit while moving the roll of the membrane longitudinally within the conduit with means attached to the roll and actuated from a position external to the conduit.

The apparatus of this invention is a device for internally wrapping a flexible membrane and sealing material upon the inner circumferential wall of a hollow conduit, cylinder or pipe having a longitudinal axis comprising:
  a. a traveling transport assembly means, constructed to fit within the conduit, including a carriage constructed to bear against and move longitudinally along the inner wall, with the carriage rotatively carrying a spindle supporting a roll of the membrane for rotation relative to the conduit;
  b. with the carriage supporting a motive means to drive the spindle in rotation while unrolling the membrane, and also with the carriage supporting a pressure member bearing against the unrolled membrane and pressing the unrolled membrane toward the inner wall and adhering the sealing material to the inner wall; and
  c. means connected to the carriage for supplying longitudinal motion to the assembly through the conduit, and for supplying energy to the motive means.

In many industries, and for many years, there has been a need for coating and sealing the inner wall surface of cylindrical vessels. This need has been met in various ways but better solutions are still sought, especially in connection with small relatively long conduits such as pipelines. Many pipelines are so small as not to be accessible by human workers so that the application of closings and seals at any distance beyond an arms length renders very difficult a satisfactory sealing or closing operation.

It is a common practice to pull or push an object, plug or mechanism through a pipeline to accomplish the cleaning, sealing or coating.

U.S. Pat. Nos. 3,606,862, 3,885,521 and 4,249,475 disclose examples of these so-called "pigs" for pipeline treatments.

Nevertheless, because coating and sealing operations are carried out beyond the sight of the operators and by remote control, the quality of the final work is often unsatisfactory.

The natural gas service industry is one which needs new and improved repair methods that could be used as alternatives to the techniques and procedures now used in the industry for repairing leaks in gas distribution mains and services. In this industry, steel pipe continues to be the dominant material in existing pipelines. Most of the leaks in both mains and services have occurred in steel pipe, reflecting the greater amount of steel pipe in use. More than three times as many leaks per total mile occur in steel mains as occur in cast iron mains, although leaks in cast iron mains have been increasing as a percentage of the total leaks in the systems.

Most leaks in steel mains and services are the result of the corrosion of the piping itself whereas the majority of leaks in cast iron mains have occurred at the bell joints. Despite the past search for effective methods, the repair technique of choice has been and continues to be the implacement of various types of clamps upon the outside of leaking sections of pipe.

As stated, the primary mode of failure in steel pipe is corrosion which usually attacks the exterior surface of buried pipe. Although corrosion leaks can be repaired from inside the pipe, no known internally applied technique can prevent continued corrosion of the exterior surface with its attendant liklihood of future leaks in locations adjacent to the repair area. Thus, the ideal technique for correcting corrosion leaks would solve the dual problem of repair and prevention. Two most important criteria for an appropriate repair technique are that the technique must seal existing leaks and allow passage of the same volume of gas as carried by the steel pipe.

An important additional criteria for methods of repairing leaks in pipelines is the cost. Costs of repairs and seals are influenced, of course, by time and materials and the efforts expended in excavations, etc.

It is an object of this invention to provide a process and apparatus for repairing pipelines and in a broader sense, other conduits and cylinders, by coating the interior walls with a membrane and a sealant continuously along the length of the conduit by remote manipulation of an internal wrapping apparatus and method. It is a purpose to accomplish the objectives and meet the criteria, with a satisfactory sealing and coating method in a manner more economical than prior techniques.

The foregoing and other advantages of the invention will become apparent from the following disclosure in which a preferred embodiment of the invention is described in detail and illustrated in the accompanying drawings. It is contemplated that variations in procedures, structural features and arrangement of parts may appear to the person skilled in the art, without departing from the scope or sacrificing any of the advantages of the invention.

DESCRIPTION OF THE DRAWINGS

FIG. 2 is a sectional elevational view of the apparatus of this invention taken along the line 2—2 of FIG. 1.

FIG. 3 is a sectional elevational view of the apparatus taken along the line 3—3 of FIG. 2.

DETAILED DESCRIPTION OF THE INVENTION

Figure 1:
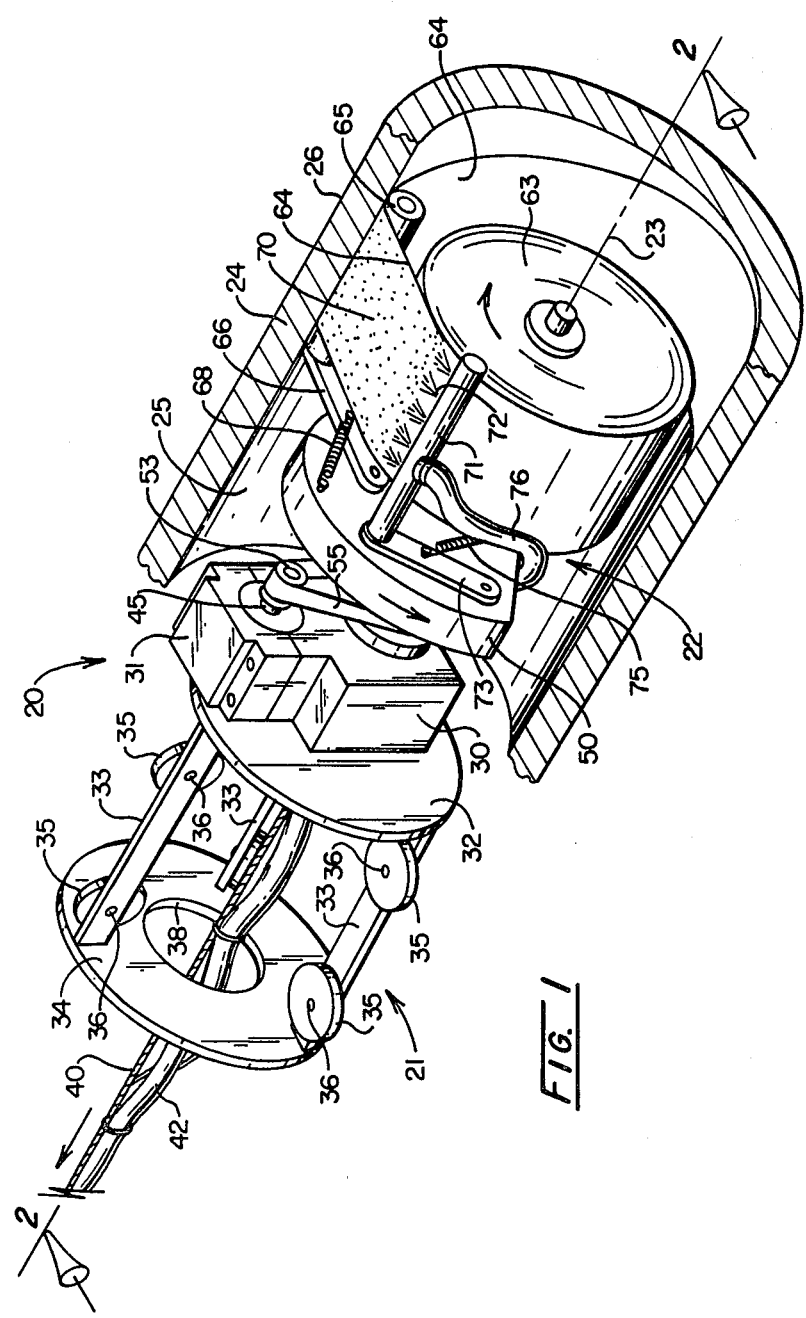
FIG. 1 is a sectional elevational perspective view of a preferred embodiment of the apparatus of this invention, which may be used to practice the method of this invention.

Referring to FIGS. 1 and 2, a traveling transport assembly means 20 includes a carriage 21 supporting a spindle assembly 22. The transport assembly 20 is positioned generally concentric to the longitudinal axis 23 of a conduit 24 having an inner wall 25 and an outer wall 26.

The carriage 21 includes a frame 30 supporting a rotative motive means 31, shown in FIGS. 1 and 2 as an air motor. The frame 30 also supports a header 32 which carries a plurality of beams 33 that are connected to a face plate 34. The beams 33 support a plurality of bearing means or wheels 35 on axle means 36. In a preferred embodiment shown, three beams and three sets of radially equally spaced wheels are provided which is probably the minimum convenient number, but more could be used.

The header 32 and the face plate 34 are constructed to generally fit within the conduit without rubbing the surface and are provided with centrally located apertures 37 and 38 respectively.

Means for supplying longitudinal motion to the assembly 20 and carriage 21 is provided by a cable 40 through a screw eye 41 or other conventional attachment means. It will be seen, that tension on the cable 40 in the direction of the arrow shown in FIGS. 1 and 2, will cause the carriage 21 to move longitudinally in the conduit 24, supported from and rolling upon the inner wall 25.

As shown in FIGS. 1, 2 and 3, the bearing means 35 contact the inner wall 25 of the conduit 24 on opposing sides of the longitudinal axis 23.

A flexible hose 42 is connected through suitable fittings 43 and a passage 44 in the frame 30 to the motive means 31. Energy, in the form of compressed air supplied from an external source through the hose 42, drives a shaft 45 in rotation by the air motor 31.

The spindle assembly 22 comprises a crank member 50 which is rotatively supported by a hollow shaft 51 that is carried by a bearing 52 in the frame 30.

By means of a pulley 53 keyed to the shaft 45 and a pulley 54 keyed to the shaft 51, which are connected by a belt 55, the spindle assembly 22 is driven in rotation about the longitudinal axis of the conduit 24 and the carriage 21.

Referring now also to FIG. 3, the crank 50 supports a spindle shaft 60, typically held by a retainer plate 61 and screws 62. The spindle shaft 61 is constructed to rotatively support a roll 63 of membrane material 64 of a type that is impervious to deleterious effects from the type of fluid to be carried in the conduit 24. If the fluid is natural gas, a typical membrane material could be polyethylene or stainless steel.

In the method of this invention, the membrane is unwound from the roll 63 and then pressed against and adhered to the inner circumferential wall 25 of the conduit 24. To accomplish these procedures, the crank 50 supports a pressure roll 65 which is carried by an arm 66 that rotates about a pin 67. Tension is applied by a spring 68 to influence the pressure roll 65 toward the inner circumferential wall 25 conveying the membrane 64 toward the inner wall 25.

The crank 50 also carries a hollow spreader bar means 71 to place a fluid adhesive sealant material 70 upon the surface of the membrane material 64 prior to its passage over the pressure roll 65 and toward the inner wall 25. The adhesive 70 is spread upon the membrane 64 by the spreader bar means 71. The spreader bar means 71 acts as a manifold distributing adhesive through outlets 72. Bar 71 is supported by an arm 73 which is rotatively connected to the crank 50 by a pin 74. The spreader 71 rests upon and is maintained in contact with the roll 63 surface under the influence of a spring 75.

In the embodiment of the invention shown, the adhesive material 70 is supplied to the manifold of the spreader 71 by a hose 76. The hose 76 is fed through a fitting 85 from a passage 77 (see FIG. 2) in the crank 50, which in turn is fed from an inner bore 78 of the shaft 51. Adhesive material 70 is brought to the inner bore 78 from a chamber 79 in the frame 30 which is fed from a passage 80, a fitting 81 and an inlet hose 82. A seal 83 is provided to prevent leakage of the fluid adhesive sealant material from the chamber 79 into and through the bearing 52.

Alternatively, the adhesive sealant material could be fed from a reservoir carried by the transport assembly means 20.

The operation of the embodiment shown of the apparatus of this invention is as follows:

The cable 40 is stretched through a length of conduit, such as a pipe for natural gas, from one access position to another. The distance between one station and the next may be a nominal short distance or a much greater distance of perhaps 500 feet (152 meters). At one end, the beginning end, the cable 40 is attached to the transport assembly means 20 at the frame 30. Air hose 42 and an inlet hose 82 for the supply of sealant 70 are passed through the conduit with the cable 40 and attached to the frame 30 through the fittings 43 and 81, respectively. An additional flexible cable containing control wires or lines (not shown) may also be provided through the conduit 24 with the cable 40. The control lines may be used to control the operation of the motive means 31 and the flow of adhesive sealant 70 by valve means (not shown).

The operation is continued by pulling the transport assembly 20 through the conduit 24 by tension on the cable 40 in the direction of the arrow shown in FIGS. 1 and 2. Simultaneously, air supplied to air motor 31 causes the spindle 50 to rotate (counterclockwise as shown by the arrow in FIG. 1). With rotation of the spindle 50, membrane 64 is unwound from the roll 63 as adhesive 70 is spread upon the outer surface by the spreader bar means 71. The rotation of the spindle 50 also causes the roller 65 to press the membrane toward the inner wall 25 of the conduit 24 under the influence of the arm 66 and the spring 68.

Because the bearing means 35 contact the inner wall 25 on opposing sides of the longitudinal axis 23, transport assembly 20 is maintained in a central position in the conduit 24 even thought the pressure of supporting the membrane against the inner wall rotates 360° and is sometimes pressing against the upper surface area of the conduit 24.

The adhesive is impressed between the membrane 64 and the inner wall 25, sealing any leaks and defects in the conduit 24. At the same time, the adhesive sealant 70 causes the membrane 64 to adhere to the inner wall. Due to the simultaneous wrapping operation and longitudinal motion of the transport assembly, the membrane is wrapped internally upon the inner wall in the form of a helical spiral. The pitch of the spiral is determined by the rate of rotation and the speed of longitudinal movement. The transport assembly is centrally positioned and carried by the wheels 35 as it rolls through the conduit to the exit access position.

The method of this invention is carried out when the sealing membrane is spirally unwound from the roll within the conduit followed by pressing and adhering the membrane against the inner circumferential wall of the conduit while moving the roll of the membrane longitudinally within the conduit and the various steps are actuated from a position external to the conduit. The process of the invention is particularly significant to the natural gas pipeline industry as it provides a means for not only sealing leaks which occur in the pipeline due to corrosion from the outside or the inside, but it also provides a new surface to the inside of the pipeline preventing the occurrence of additional leaks and defects from further corrosion. This process is operated from a position external to the pipeline, and previously inaccessible points in the pipeline are repaired and maintained by the method of this invention.

The apparatus of this invention is especially conceived to carry out the method of the invention. However, the method may be carried out by other apparatus such as by a person reaching into the pipeline or crawling into the pipeline if it is large enough. This invention may be used with both steel and cast iron pipe as well as other conduit materials.

In each use of the method, an appropriate selection must be made for the proper adhesive sealant and the proper membrane material for compatibility with the pipeline material and the fluid which the conduit is to carry.

In an alternative embodiment of this invention, the membrane may be supplied with an adhesive sealant previously applied to a surface of the membrane. "Adhesive tapes" are well known and conventional, and the concepts of their use are well known. In an apparatus for the application of a membrane with the adhesive sealant previously applied, those portions and members associated with the supply of adhesive to membrane are eliminated as they are not necessary. While this greatly simplifies the apparatus and method, in many situations the application of sufficient adhesive sealant of the proper composition will require that the adhesive be applied insitu as described in detail for the first embodiment.

An important feature of this invention is that after a pipeline has been internally wrapped and sealed by this method, the pipeline is capable of carrying substantially the same amount of fluid as it previously carried. This is because the membrane need only be a few millimeters thick which will produce an insignificant decrease in the cross-sectional area.

Although a preferred embodiment of the invention has been herein described, it will be understood that various changes and modifications in the illustrated and described structure can be effected without departure from the basic principles that underlie the invention. Changes and modifications of this type are therefore deemed to be circumscribed by the spirit and scope of the invention, except as the same may be necessarily modified by the appended claims or reasonable equivalence thereof.

What is claimed is:

1. A method of coating and sealing the interior wall of a stationary conduit comprising:
    applying motive means positioned within the conduit to spirally unwind a sealing membrane from a roll within the conduit,
    applying by motive means within the conduit, an adhesive material between the membrane and the inner circumferential wall of the conduit,
    followed by pressing and adhering the membrane against the sealing material and against the interior circumferential wall of the conduit,
    while moving the roll of the membrane longitudinally within the conduit by means attached to the motive means, actuated and controlled from a position external to the conduit.

2. A method according to claim 1 wherein the adhesive sealing material is applied to the surface of the membrane as the membrane is unwound and before it is pressed toward the inner circumferential wall of the conduit.

3. A method according to claim 1 wherein the means for moving the roll of the membrane longitudinally within the conduit is actuated by tension within a cable attached to the means attached to the roll.

4. An apparatus for internally wrapping a flexible membrane and sealing material upon the inner circumferential wall of a stationary hollow conduit having a longitudinal axis comprising:
    a. a transport assembly means, constructed to fit within the conduit and move longitudinally, with the transport assembly means rotatively supporting a spindle to support a roll of the membrane for rotation relative to the conduit;
    b. the transport assembly means also supporting a motive means to drive the spindle in rotation while unrolling the membrane, and also with the transport assembly means supporting a pressure member for influencing the unrolled membrane toward the inner wall and adhering the sealing material to the inner wall; and
    c. means connected to the transport assembly means from an operator's position external to the conduit for supplying longitudinal motion to the transport assembly means through the conduit, while simultaneously supplying energy to the motive means and supplying sealing compound.

5. An apparatus according to claim 4 wherein the transport assembly means includes a carriage constructed to bear against on opposing sides and move longitudinally along the inner wall of the conduit with the carriage rotatively supporting the spindle.

6. An apparatus according to claim 4 wherein the transport assembly means supports a carriage constructed to bear against on opposing sides and move longitudinally along the inner wall with the carriage supporting a motive means to drive the spindle in rotation while unrolling the membrane.

7. An apparatus according to claim 4 wherein the transport assembly means includes a carriage constructed to bear against on opposing sides and move longitudinally along the inner wall, with the carriage supporting a pressure member bearing against the unrolled membrane and pressing the unrolled membrane toward the inner wall and adhering the sealing material to the inner wall.

8. An apparatus according to claim 8 wherein the carriage comprises a frame including at least 3 radially spaced bearing members that bear against on opposing sides and move longitudinally along the inner wall.

9. An apparatus according to claim 4 wherein the spindle supports a spreader means for applying a fluid, adhesive sealant to the membrane before it is internally wrapped upon the inner circumferential wall.

* * * * *